United States Patent [19]

Hall et al.

[11] 4,149,339
[45] Apr. 17, 1979

[54] HANGING PLANT HOLDER

[75] Inventors: Charles P. Hall, Muir Beach; David C. Richards, Oakland, both of Calif.

[73] Assignee: Basic Designs, Inc., Sausalito, Calif.

[21] Appl. No.: 743,455

[22] Filed: Nov. 19, 1976

[51] Int. Cl.$^2$ .............................................. A01G 9/02
[52] U.S. Cl. .......................................... 47/67; 47/81; 229/54 R
[58] Field of Search ................. 47/67, 68, 81, 87, 64, 47/84, 79, 86, 66; 229/54 R

[56] References Cited

U.S. PATENT DOCUMENTS

| | | | |
|---|---|---|---|
| 2,152,869 | 4/1939 | Campbell | 47/81 |
| 2,810,235 | 10/1957 | Magid | 47/81 |
| 2,887,824 | 5/1959 | Riva | 47/41 |
| 2,956,370 | 10/1960 | Wiebolt | 47/67 |
| 3,052,063 | 9/1962 | Dunn | 47/81 |
| 3,241,264 | 3/1966 | Porter et al. | 47/81 |
| 3,606,137 | 9/1971 | Kugler | 229/54 R |
| 3,611,634 | 10/1971 | Dalton | 47/77 |
| 3,613,309 | 10/1971 | Coburn | 47/64 X |
| 3,733,745 | 5/1973 | Ingerstedt et al. | 47/77 |
| 3,739,522 | 6/1975 | Greenbaum | 47/87 |
| 3,872,621 | 3/1975 | Greenbaum | 47/87 |
| 3,971,160 | 7/1976 | Vajtay | 47/84 |
| 4,000,580 | 1/1977 | Biehl | 47/79 |
| 4,021,966 | 5/1977 | Rimpinen et al. | 47/86 |

FOREIGN PATENT DOCUMENTS

| | | | |
|---|---|---|---|
| 901532 | 5/1972 | Canada | 229/54 R |
| 2526961 | 5/1976 | Fed. Rep. of Germany | 229/54 R |
| 2036163 | 12/1970 | France | 47/67 |
| 2231309 | 12/1974 | France | 47/68 |
| 572652 | 2/1958 | Italy | 47/84 |
| 405057 | 7/1966 | Switzerland | 229/54 R |
| 418807 | 2/1967 | Switzerland | 229/54 R |

OTHER PUBLICATIONS

Anon. (1951) "Greenhouse Plants Grown and Transplanted in Plastic Bags" *Popular Science* vol. 158, No. 5, p. 98.

McDonald, S. (1976) "An Inexpensive Seed Germinator" *Organic Gardening and Farming* vol. 23, No. 3, p. 72.

*Primary Examiner*—Edgar S. Burr
*Assistant Examiner*—James R. Feyrer
*Attorney, Agent, or Firm*—Flehr, Hohbach, Test, Albritton & Herbert

[57] ABSTRACT

Plant holder formed of flexible material and having a pocket for a plant, a water reservoir, and straps for hanging the device from a curtain rod or other suitable support.

2 Claims, 3 Drawing Figures

HANGING PLANT HOLDER

BACKGROUND OF THE INVENTION

This invention pertains generally to plant holders and more particularly to a plant holder which can be hung from a curtain rod or other suitable support.

SUMMARY AND OBJECTS OF THE INVENTION

The invention provides a plant holder comprising two superposed sheets of flexible material joined together to form a pocket for holding a plant, a water reservoir below the pocket and a water passageway between the pocket and reservoir. A wick of hydroponic material extends through the passageway for carrying the water from the reservoir to the pocket, and means is included for hanging the planter from a curtain rod or other suitable support.

It is in general an object of the invention to provide a new and improved plant holder.

Another object of the invention is to provide a plant holder of the above character which can be hung from a curtain rod or other suitable support.

Additional objects and features of the invention will be apparent from the following description in which the preferred embodiment is set forth in detail in conjunction with the accompanying drawings.

DESCRIPTION OF THE PREFERRED EMBODIMENT

Figure 1:
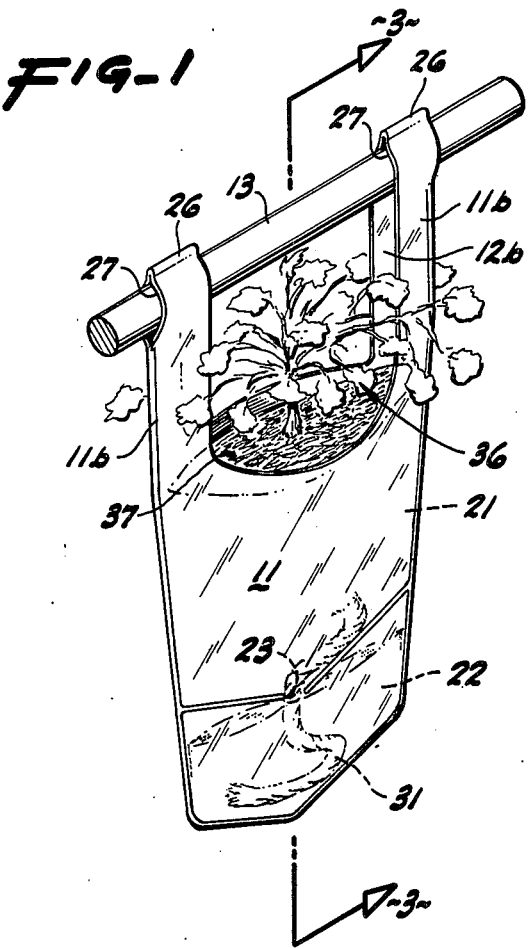
FIG. 1 is an isometric view of one embodiment of a plant holder incorporating the invention.
Figure 2:
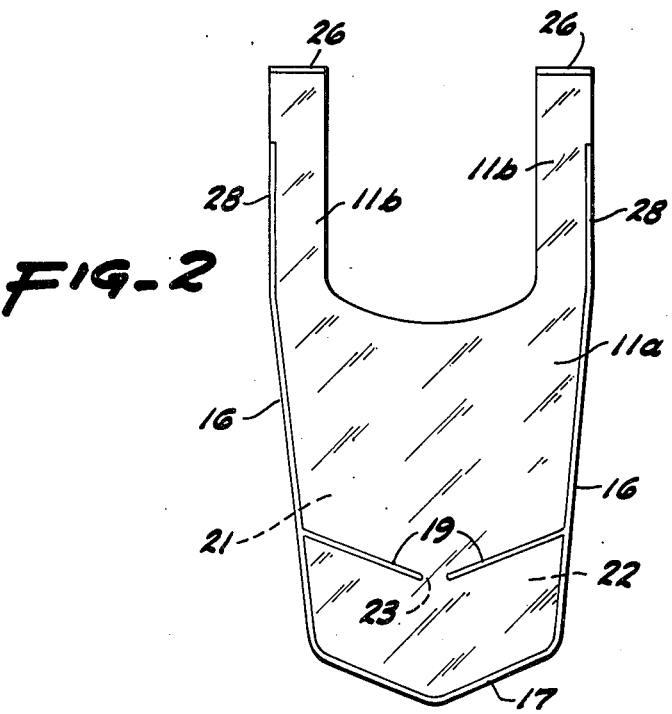
FIG. 2 is a front elevational view of the plant holder of FIG. 1.
Figure 3:
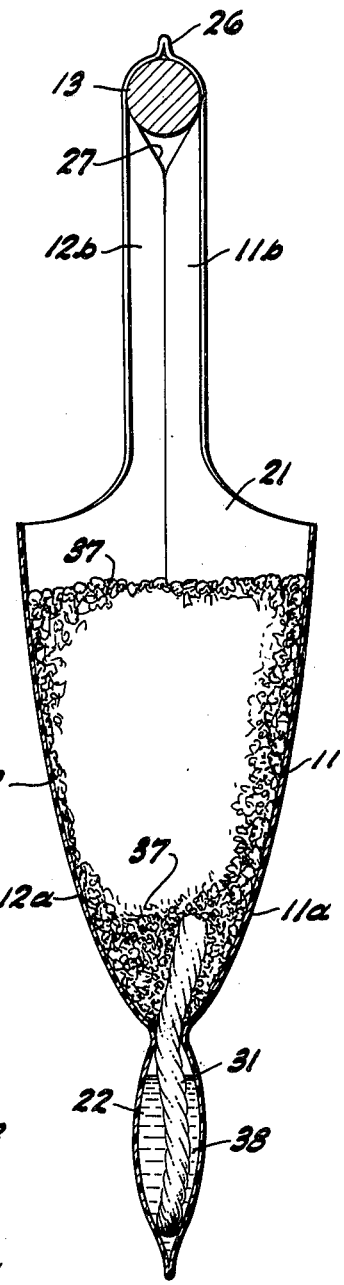
FIG. 3 is an enlarged sectional view taken along line 3—3 in FIG. 1, with the plant omitted for clarity of illustration.

As illustrated, the plant holder comprises two superposed sheets 11, 12 of a flexible material such as vinyl plastic, each of which includes a body portion 11a, 12a and a pair of hanger straps 11b, 12b which extend from the upper edge of the body portion. In the preferred embodiment, the plant hanger is intended to be hung in a window from a curtain rod 13 or other horizontal support, and the sheets are fabricated of a material which is transparent to ultraviolet radiation and visible light.

Sheets 11, 12 are joined together by suitable means such as heat sealing or electrosonic welding along the side margins 16 and lower margins 17 of the body portions. The sheets are also joined together along lines 19 intermediate the upper and lower margins of the body portion to divide that portion into a plant pocket 21 and a water reservoir 22, with an opening or water passageway 23 between the pocket and reservoir.

In addition, the sheets are joined together along the upper margins 26 of the straps to form loops 27 for receiving curtain rod 13. The sealing along side margins 16 continues along the outer side margins 28 of the straps and terminates at the lower extremities of loops 27.

A wick 13 of hydroponic material such as twisted cotton fibers extends through opening 23 between pocket 21 and reservoir 22 for drawing water from the reservoir to the pocket by capillary action. If desired, the wick can be omitted, in which case water dripping from the plant is allowed to accumulate in the reservoir.

Operation and use of the plant hanger are as follows. Initially, it is assumed that the wick is to be used, that a plant 36 has been placed in pocket 21 with a body of soil 37 or other suitable planting medium, and that the device is hung from curtain rod 13 by passing the rod through loops 27. Water or other liquid nourishment is poured into the pocket and allowed to accumulate in reservoir 22, as indicated at 38. Thereafter the liquid is drawn by capillary action up into the pocket to the plant.

If the wick is omitted, the plant and planting medium are placed in the pocket and the device is hung as before. However, instead of filling the reservoir at the outset, the water or other nutrient is added to the plant as needed, and any excess is allowed to accumulate in the reservoir.

Although illustrated as being hung from a curtain rod, the plant holder can be hung in a number of different ways. For example, it can be mounted on a wall by nails or pegs passing through openings 27 with the straps twisted so that the openings face the wall.

The plant holder has a number of important features and advantages. It is light in weight and can be hung in a variety of locations. It enables a plant to be placed in a window for optimum exposure to the sun. It is attractive in appearance and economical to manufacture.

It is apparent from the foregoing that a new and improved hanging plant holder has been provided. While only one presently preferred embodiment has been described, as will be apparent to those familiar with the art, certain changes and modifications can be made without departing from the scope of the invention as defined by the following claims.

What is claimed is:

1. A plant holder for hanging a plant from a horizontally extending support, comprising: first and second superposed sheets of flexible material each including a body portion and a pair of strap portions extending upwardly from the upper margins of the body portions; means joining the sheets together continuously along the lower and side margins of the body portions and along the outer side margins of the strap portions to points spaced a predetermined distance below the upper margins of the strap portions; means joining the sheets together along a line intermediate the upper and lower margins of the body portions to form a pocket for holding the plant, a water reservoir below the pocket and an opening between the pocket and reservoir; and a wick of hydroponic material extending through the opening and into the reservoir and pocket; the sheets being joined together along the upper margins of the strap portions to form loops for receiving the support.

2. The plant holder of claim 1 wherein the sheets are fabricated of a transparent material.

* * * * *